(12) United States Patent
Whear et al.

(10) Patent No.: US 6,537,696 B2
(45) Date of Patent: Mar. 25, 2003

(54) NONWOVEN SEPARATOR FOR A NICKEL-METAL HYDRIDE BATTERY

(75) Inventors: J. Kevin Whear, Utica, KY (US); Joseph G. Yaritz, Utica, KY (US)

(73) Assignee: Daramic, Inc., Burlington, MA (US)

( * ) Notice: Subject to any disclaimer, the term of this patent is extended or adjusted under 35 U.S.C. 154(b) by 0 days.

(21) Appl. No.: 09/745,026

(22) Filed: Dec. 20, 2000

(65) Prior Publication Data

US 2002/0110730 A1 Aug. 15, 2002

(51) Int. Cl.[7] ............... H01M 2/16; H01M 2/14; D04H 3/00
(52) U.S. Cl. ............ 429/144; 429/145; 429/249; 429/250
(58) Field of Search ............... 429/142, 144, 429/145, 249, 250, 254

(56) References Cited

U.S. PATENT DOCUMENTS

| | | | | |
|---|---|---|---|---|
| 4,078,124 A | * | 3/1978 | Prentice | 156/290 |
| 4,165,352 A | | 8/1979 | Volkman | |
| 5,318,866 A | * | 6/1994 | Degen et al. | 429/206 |
| 5,374,259 A | | 12/1994 | Takahashi et al. | |
| 5,589,302 A | | 12/1996 | Degen et al. | |
| 5,645,956 A | * | 7/1997 | Degen et al. | 429/142 |
| 5,733,635 A | | 3/1998 | Terakawa et al. | |
| 5,830,604 A | | 11/1998 | Singleton et al. | |
| 5,962,161 A | | 10/1999 | Zucker | |

FOREIGN PATENT DOCUMENTS

| | | |
|---|---|---|
| EP | 0203459 | 12/1986 |
| EP | 0498414 | 8/1992 |
| EP | 0634802 | 1/1995 |
| EP | 0981172 | 2/2000 |
| JP | 2-133607 | 5/1990 |
| JP | 2-133608 | 5/1990 |
| JP | 3-55755 | 3/1991 |
| JP | 4-346825 | 12/1992 |
| JP | 5-106112 | 4/1993 |
| JP | 11-185722 | * 7/1999 |
| JP | 11-283602 | * 10/1999 |
| JP | 2001-143682 | 5/2001 |
| WO | WO 00/41254 | 7/2000 |

* cited by examiner

*Primary Examiner*—Stephen Kalafut
*Assistant Examiner*—Jonathan Crepeau
(74) *Attorney, Agent, or Firm*—Robert H. Hammer, III

(57) ABSTRACT

The preferred embodiment is to a battery separator for a nickel metal hydride (NiMH) battery. The separator includes a wettable, resilient nonwoven web having two spunbond layers sandwiching a melt blown layer. The web has a puncture strength of greater than 6 newtons, a tensile strength of greater than 200 newtons/meter, and an average pore size of less than 20 microns.

19 Claims, No Drawings

NONWOVEN SEPARATOR FOR A NICKEL-METAL HYDRIDE BATTERY

FIELD OF THE INVENTION

This invention is directed to a nonwoven battery separator for a nickel-metal hydride (NiMH) battery.

BACKGROUND OF THE INVENTION

A nonwoven separator for a nickel-metal hydride battery is known. See, for example, U.S. Pat. Nos. 5,589,302 and 5,830,604, both incorporated herein by reference.

Nickel-metal hydride (NiMH) batteries are known. See: Linden, D., Ed., *Handbook of Batteries*, $2^{nd}$ Ed., McGraw-Hill, Inc. (1995), Chapter 33; and Besenhard, J. O., Ed., *Handbook of Battery Materials*, Wiley-VCH (1999), §§9.3.3.2 and 9.3.5, both are incorporated herein by reference. In general, NiMH batteries are an improvement over nickel-cadmium (NiCd) batteries. One advantage of the NiMH battery is that higher energy densities can be reached. Practically, this means that more energy can be obtained with the same volume because the metal hydride electrode can be made smaller. As with all battery technologies today, one important driver for development is obtaining higher energy densities. One way of increasing energy densities is to make the separator thinner, so that it takes up less space within the battery. To make the separator thinner, one must balance numerous competing factors. For example, the strength of the separator is important during cell manufacture and strength may be easily obtained by increasing, for example, thickness; but increased thickness can be detrimental to the cell energy density or the internal electrical resistance of the battery. Furthermore, the NiMH electrodes expand and contract during charging and discharging which creates a preference for a separator that will expand and contract with the electrodes. The proper balance of these factors is far from mere optimization, but instead, it requires tedious experimentation. Accordingly, there is a need for improved separators for NiMH batteries.

Several different types of separators have been suggested for use in alkaline battery systems, such as NiMH batteries. See: Besenhard, *Ibid.* §9.3.5, Tables 15–17. Those separators have been classified as: 1) nonwoven materials; 2) microporous materials; and 3) semipermeable materials. Of particular interest to the instant invention are the nonwoven materials. A nonwoven material (or fabric) is made from randomly-positioned fibers (e.g., a web) which are held together by mechanical interlocking, by fusing of the fibers, and/or by bonding the fibers (e.g., with a cementing medium). Web formation may be accomplished by various processes including, dry laying, wet laying, or extrusion of filaments onto a moving belt. Within the extrusion category, two processes include spunbonding (making spunbonded nonwovens) and melt-blowing (making melt-blown nonwovens). See: Turbak, A., Ed., *Nonwovens: Theory, Process, Performance, and Testing*, TAPPI Press, Atlanta, Ga. (1993). Chp 8, incorporated herein by reference. Spunbonded nonwovens are formed by filaments that have been extruded, drawn, and then laid on a continuous belt. Melt-blown nonwovens are formed by extruding molten polymer through a die, attenuating, via air or steam, the extruded filament and collecting them on a moving belt.

It is known to use a spunbond nonwoven as a separator in NiMH batteries. See: U.S. Pat. No. 5,830,604. It is known to use a melt-blown nonwoven as a battery separator. See: U.S. Pat. No. 5,962,161. It is known to use an SMS nonwoven in an alkaline battery system. See PCT Publication No. WO 00/41254. The foregoing separators, however, have not met the stringent demands necessary for use in a NiMH battery. Specifically, the foregoing nonwovens either have: pores which are too large, but have sufficient tensile and puncture strength (i.e., spunbond); or pores which are adequately sized, but have insufficient tensile and puncture strength (i.e., melt-blown); or a non-resilient or insufficiently resilient thickness (i.e., SMS).

Finally, since most nonwovens are made of polyolefins, which are inherently hydrophobic, they must be made hydrophilic so that the aqueous electrolyte will wet out the separator. Hydrophilic refers to the ability to "wet-out" a liquid. "Wet-out" refers to the ability to cause a liquid (e.g., an aqueous solution) to penetrate more easily into, or spread over the surface of another material. Hydrophobic refers to the inability to "wet-out" a liquid.

Accordingly, there is a need for a wettable, resilient nonwoven separator having sufficient mechanical properties and sufficiently small pores for use in NiMH battery.

SUMMARY OF THE INVENTION

Preferably, the instant invention is to a battery separator for a nickel-metal hydride (NiMH) battery. The separator includes a wettable, resilient nonwoven web having two spunbond layers sandwiching a melt-blown layer. The web has a puncture strength of greater than 6 newtons, a tensile strength of greater than 200 newtons/meter, and an average pore size of less than 20 microns.

DESCRIPTION OF THE INVENTION

A battery generally comprises an anode, a cathode, a separator, and an electrolyte. The separator is located between the anode and the cathode. The electrolyte is in fluid communication between the anode and the cathode via the separator. The instant invention is useful in alkaline battery systems, e.g., nickel-cadmium (NiCd) systems and nickel-metal hydride (NiMH) systems. The instant invention is, preferably, directed to nickel-metal hydride (NiMH) batteries. Hereinafter, the instant invention shall be discussed in relationship to the preferred battery system, the NiMH battery.

There are several different constructions for NiMH batteries: prismatic-single wrap; prismatic-double wrap; and spiral wound. Prismatic and spiral generally refer to shape of the cell, prismatics are generally rectangular in cross section, and spirals, circular. Single and double wrap refers to the separator and the electrode. A single wrap has only one separator between the anode and cathode, while the double wrap has one separator around the cathode and one around the anode. Furthermore, each of these constructions have different separator requirements. For example, both constructions require a resilient nonwoven. Prismatic cells require more "loftiness" (or compressibility) than spiral cells. Loftiness, i.e., the firmness, resilience, and bulk of the web, is necessary because during cycling (charging and discharging), the electrodes expand and contract. Double wrapped cells should have lower basis weights than single wrapped cells because there is more separator material in a double wrapped cell that reduces the energy density of the cells. The requirements for these constructions are:

| Specification | Units | Prismatic-Single wrap | Prismatic-Double wrap | Spiral Wound |
|---|---|---|---|---|
| Basis Weight | g/m² | <45 | <30 | <45 |
| Thickness @ 1.5 psi | Microns | >225 | >150 | <150 |
| Thickness @ 100 psi | Microns | <125 | <80 | <100 |
| MD[1] Tensile | N/m | >550 | >550 | >550 |
| MD Elongation | % | >10 | >10 | >10 |
| TD[2] Tensile | N/m | >200 | >200 | >200 |
| Puncture | N | >6 | >6 | >6 |
| Average Pore Size | Microns | <20 | <20 | <20 |
| Maximum Pore Size | Microns | <50 | <50 | <50 |

[1]/MD = machine direction
[2]/TD = transverse direction

The separator, according to the instant invention, comprises a nonwoven web. The web includes at least one spunbond layer (S) and one melt-blown layer (M). Preferably, the web has two spunbond layers sandwiching a melt-blown layer (SMS), and most preferably, two spunbond layers sandwiching two melt-blown layers (SMMS). Other combinations of spunbond and melt-blown layers are also possible, for example: MSM, MSSM, SMSM, MMSS, SMSMS, etc. The manufacture of such webs is well known. For example, see: U.S. Pat. Nos. 5,374,259; & 5,733,635, each is incorporated herein by reference. For example, the spunbond layer is piddled onto a moving belt, the melt-blown layer(s) is then laid on the spunbond layer, and finally the last spunbond layer is laid on the melt-blown layer. For additional information about the spunbond and melt-blown processes, see: Turbak, *Ibid*, Chp 8, incorporated herein by reference.

The foregoing nonwoven separators have: a puncture strength of greater than 6 newtons, preferably greater than 9 newtons; a tensile strength of greater than 200 newtons/meter, preferably greater than 600 newtons/meter; an average pore size of less than 20 microns, preferably in the range of 5–15 microns; and resiliency of at least 40%, preferably 50%, and most preferably 60%.

All report values were obtained using industry standard methods.

Average pore size is measured with an Automated Capillary Flow Porometer, available from Porous Materials Inc. of Ithaca, N.Y. using its Capillary Flow Porometry Test Software Version 6.0.

Thickness at pressure (1.5 psi and 5 psi) is measured with a TMI Gage Model 49-72, available from Testing Machines Incorporated of Amityville, N.Y. Thickness at pressure (100 psi) is measured by stacking 10 sheets of the subject nonwoven between plates of a known area and thereafter compressing to 100 psi (by applying the required force). The average thickness is reported.

Tensile strength and elongation (i.e., at break) are measured with an Instron, Model 1126, 1130, or similar capable of measuring up to 100 N force and 500 mm elongation with pneumatic clamps (width at least 30 mm). The sample is cut into a "dog-bone" shape per DIN 53 455 No. 4. The pulling speed is set to 300 mm/min and clamp separation to 80 mm.

Puncture resistance is measured with a Chatillon force gauge (Chatillon DFI-10 or similar), a Chatillon test stand (Chatillon TCM-200 or successor), and a puncture tip having a rounded tip (with a 1.930 mm diameter). The equipment is set with an upper travel limit about 6 mm above the puncture base, a lower travel limit about 4–8 mm below the puncture base, and tip travel speed of 300 mm/min.

Resiliency refers to the ability to return to an original shape (or substantially that original shape) after being bent or compressed. Resiliency herein is measured by the amount of compression which a web can endure and return to substantially its original thickness. Compression is the difference of thickness between 1.5 psi and 100 psi divided by thickness at 1.5 psi.

The preferred embodiment, an SMMS construction, is further illustrated with reference to the following Table.

| | 1 | 2 | 3 | 4 | 5 | 6* | 7* |
|---|---|---|---|---|---|---|---|
| Basis Weight (g/m²) | 24 | 30 | 36 | 39 | 50 | 36 | 39 |
| Thickness @ 1.5 psi, micron | 152 | 191 | 236 | 239 | 290 | 71 | 99 |
| Thickness @ 5 psi, micron | 132 | 165 | 196 | 203 | 251 | 53 | 84 |
| Thickness @ 100 psi, micron | 114 | 137 | 168 | 173 | 203 | — | — |
| MD Tensile, Newton/meter | 585 | 650 | 717 | 842 | 1200 | 703 | 948 |
| TD Tensile, Newton/meter | 278 | 330 | 410 | 537 | 773 | 342 | 400 |
| MD Elongation % | 11.9 | 12.4 | 18.9 | 22.1 | 27.8 | 23.7 | 19.0 |
| TD Elongation % | 14.1 | 11.9 | 22.9 | 24.8 | 34.9 | 16.2 | 18.7 |
| Puncture Strength, Newton | 6.6 | 9.4 | 11.2 | 10.1 | 15.4 | 9.7 | 10.1 |
| Average Pore Size (micron) | 10.8 | 11.7 | 11.4 | 9.5 | 9.1 | 5.7 | 5.6 |

*Compressed

The nonwoven web must be wettable, i.e., hydrophilic. Since nonwovens are principally made of thermoplastics, e.g., polyolefins, such as polyethylene and/or polypropylene (the latter is preferred), they must be treated to become hydrophilic. One such treatment is disclosed in U.S. Pat. No. 5,962,161, incorporated herein by reference. The instant invention, however, is not so limited and any hydrophilizing treatment of a polyolefin may be used. Other hydrophilizing treatment for polyolefins include: coating with a surfactant (or surface active agent or wetting agent); coating with a polymer(s), the polymer(s) having different (i.e., better) surface active properties than the polyolefin; surface activation (e.g., by plasma treatment); surface roughing to increase surface area (e.g., forming the surface); and blending the polyolefins with another polymer(s), the blend having different (i.e., better) surface active properties than the polyolefin. Examples of the foregoing are illustrated in Japanese Kokai Nos.: 2-133608 (published May 22, 1990); 2-133607 (May 22, 1990); 3-55755 (Mar. 11, 1991); 4-346825 (Dec. 2, 1992); and 5-106112 (Apr. 17, 1993); and European Patent Publication Nos. 981,172 A1 (Feb. 23, 2000); 498,414 A2 (Aug. 12, 1992); 634,802 A1 (Jan. 18, 1995); and 203,459 A2 (Dec. 3, 1986).

The present invention may be embodied in other specific forms without departing from the spirit or essential attributes thereof and, accordingly, reference should be made to the appended claims, rather than to the foregoing specification, as indicating the scope of the invention.

What is claimed is:

1. A battery separator comprising:
   a wettable nonwoven web including at least one spunbond layer and at least one melt-blown layer;
   said web being resilient after compression to 100 psi, a puncture strength of greater than 6 newtons, a tensile strength of greater than 200 newtons/meter, and an average pore size of lees than 20 microns.

2. A battery separator comprising:

a wettable nonwoven web including two spunbond layers sandwiching a melt-blown layer;

said web being resilient after compression to 100 psi, a puncture strength of greater than 6 newtons, a tensile strength of greater than 200 newtons/meter, and an average pore size of less than 20 microns.

3. The separator according to claims 1 or 2 wherein said resiliency being at least 40%.

4. The separator according to claims 1 or 2 wherein said resiliency being at least 60%.

5. The separator according to claims 1 or 2 wherein said puncture strength being greater than 9 newtons.

6. The separator according to claims 1 or 2 wherein said tensile strength being greater than 600 newtons/in.

7. The separator according to claims 1 or 2 wherein said average pore size ranging from 5 to 15 microns.

8. The separator according to claims 1 or 2 wherein said web further comprises two spunbond layers sandwiching two melt-blown layers.

9. The separator according to claims 1 or 2 wherein said web being wettable by a treatment selected from the group consisting of: coating with a surfactant, coating with a polymer, surface activating, surface roughing, blending another polymer into the web, and combinations thereof.

10. In a nickel-metal hydride battery having a separator, said separator comprising:

a wettable nonwoven web including two spunbond layers sandwiching a melt-blown layer;

said web being resilient after compression to 100 psi, a puncture strength of greater than 6 newtons, a tensile strength of greater than 200 newtons/meter, and an average pore size of lees than 20 microns.

11. A battery comprising:

a nickel electrodes;

a metal hydride electrode;

a separator located between said electrodes, said separator comprising a wettable nonwoven web including a spunbond layer and a melt-blown layer and being resilient after compression to 100 psi; and an aqueous electrolyte, said electrolyte in fluid communication with said electrodes via said separator.

12. The battery of claim 11 wherein said web having a puncture strength of greater than 6 newtons, a tensile strength of greater than 200 newtons/meter, and an average pore size of less than 20 microns.

13. The battery according to claims 10 or 12 wherein said resiliency being at least 40%.

14. The battery according to claims 10 or 12 wherein said resiliency being at least 60%.

15. The battery according to claims 10 or 12 wherein said puncture strength being greater than 9 newtons.

16. The battery according to claim 10 or 12 wherein said tensile strength being greater than 600 newtons/m.

17. The battery according to claims 10 or 12 wherein said average pore size ranging from 5 to 15 microns.

18. The battery according to claims 10 or 12 wherein said web further comprises two spunbond layers sandwiching two melt-blown layers.

19. The battery according to claims 10 or 12 wherein said web being wettable by a treatment selected from the group consisting of coating with a surfactant, coating with a polymer, surface activating, surface roughing, blending another polymer into the web, and combinations thereof.

* * * * *